(12) United States Patent
Matsumoto (10) Patent No.: US 11,212,440 B2
(45) Date of Patent: Dec. 28, 2021

(54) IMAGE PICKUP APPARATUS, IMAGE PICKUP METHOD, AND RECORDING MEDIUM BY PERFORMING ALIGNMENT AND COMBINING PROCESSING

(71) Applicant: CANON KABUSHIKI KAISHA, Tokyo (JP)

(72) Inventor: Shogo Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 16/517,337

(22) Filed: Jul. 19, 2019

(65) Prior Publication Data

US 2020/0036893 A1      Jan. 30, 2020

(30) Foreign Application Priority Data

Jul. 25, 2018  (JP) .............................. JP2018-139584

(51) Int. Cl.
| | | |
|---|---|---|
| *H04N 5/232* | (2006.01) | |
| *H04N 5/14* | (2006.01) | |
| *H04N 5/222* | (2006.01) | |
| *H04N 5/235* | (2006.01) | |

(52) U.S. Cl.
CPC ......... *H04N 5/23238* (2013.01); *H04N 5/144* (2013.01); *H04N 5/2228* (2013.01); *H04N 5/2351* (2013.01); *H04N 5/2353* (2013.01)

(58) Field of Classification Search
CPC ............. H04N 5/23238; H04N 5/2353; H04N 5/2228; H04N 5/2351; H04N 5/144; H04N 5/23254; H04N 5/35554
See application file for complete search history.

(56) References Cited

U.S. PATENT DOCUMENTS

| | | | |
|---|---|---|---|
| 9,883,119 B1 * | 1/2018 | Atanassov | ............. H04N 5/265 |
| 2002/0044691 A1 * | 4/2002 | Matsugu | .................. G06K 9/20 |
| | | | 382/218 |
| 2009/0262215 A1 * | 10/2009 | Sano | ..................... H04N 5/3535 |
| | | | 348/229.1 |
| 2011/0141228 A1 * | 6/2011 | Shimada | ............ H04N 5/23251 |
| | | | 348/36 |

(Continued)

FOREIGN PATENT DOCUMENTS

JP       2010-28764 A      2/2010

*Primary Examiner* — Alazar Tilahun
(74) *Attorney, Agent, or Firm* — Canon U.S.A., Inc. IP Division (57) ABSTRACT

An image pickup apparatus includes an image sensor, a detection sensor, a memory, and a processor. The image sensor is configured to repeatedly perform an image pickup operation to generate a set of a plurality of images with different exposures in one image pickup operation. The detection sensor is configured to perform a first detection to detect a motion of the image sensor. The processor is configured to execute instructions in the memory to perform a second detection to detect a motion vector, to select an image used to detect the motion vector in the second detection based on the motion of the image sensor from the set of the plurality of images with different exposures among the images, and to generate a combined image by performing alignment and combining processing on at least some of the images generated by the image sensor based on the motion vector.

12 Claims, 10 Drawing Sheets

(56) References Cited

U.S. PATENT DOCUMENTS

| | | | | |
|---|---|---|---|---|
| 2013/0293748 A1* | 11/2013 | Fukutomi | ............... | G06T 5/007 |
| | | | | 348/254 |
| 2014/0049657 A1* | 2/2014 | Fukunishi | ................. | G06T 7/32 |
| | | | | 348/208.4 |
| 2014/0072180 A1* | 3/2014 | Yamaguchi | ............. | G06T 7/254 |
| | | | | 382/107 |
| 2014/0184834 A1* | 7/2014 | Miyasako | .......... | H04N 5/23258 |
| | | | | 348/208.1 |

* cited by examiner

☐ LONG-PERIOD EXPOSURE PIXEL

▨ SHORT-PERIOD EXPOSURE PIXEL

IMAGE PICKUP APPARATUS, IMAGE PICKUP METHOD, AND RECORDING MEDIUM BY PERFORMING ALIGNMENT AND COMBINING PROCESSING

BACKGROUND

Field

One disclosed aspect of the embodiments relates to an image pickup apparatus that combines a plurality of images to create a panoramic image.

Description of the Related Art

A panoramic combining technique for capturing a plurality of images while causing a digital camera or the like to move, and combining the plurality of captured images is known. In the panoramic combining technique, alignment of images is essential for obtaining a combined image without a sense of strangeness. Japanese Patent Laid-Open No. 2010-28764 discusses a method for performing an alignment using motion vectors.

However, if camera shake or the like occurs while causing a digital camera to move, the accuracy of the motion vectors deteriorates and the motion vectors may not be detected, which leads to difficulty in performing panoramic combining in some cases.

SUMMARY

One aspect of the embodiments has been made in view of the above situations, and uses an image sensor capable of outputting images having different exposure times, and detects a motion vector having high accuracy even if camera shake or the like occurs.

According to an aspect of the embodiments, provided is an image pickup apparatus including an image sensor, a detection sensor, a memory, and a processor. The image sensor is configured to repeatedly perform an image pickup operation to generate a set of a plurality of images with different exposures in one image pickup operation. The detection sensor is configured to perform a first detection to detect a motion of the image sensor. The processor is configured to execute the instructions in the memory to perform a second detection to detect a motion vector from the images generated by the image sensor, to select an image used to detect the motion vector in the second detection based on the motion of the image sensor detected in the first detection from the set of the plurality of images with different exposures among the images generated by the image sensor, and to generate a combined image by performing alignment and combining processing on at least some of the images generated by the image sensor based on the motion vector.

According to the configuration of the disclosure, it is possible to provide an image pickup apparatus capable of suppressing a deterioration in the accuracy of detecting a motion vector by outputting images captured with different exposure times in a panoramic image pickup operation, even when camera shake or the like occurs.

Further features of the disclosure will become apparent from the following description of exemplary embodiments (with reference to the attached drawings).

DESCRIPTION OF THE EMBODIMENTS

Preferred exemplary embodiments of the disclosure will be described in detail below with reference to the accompanying drawings.

First Exemplary Embodiment

Figure 1:
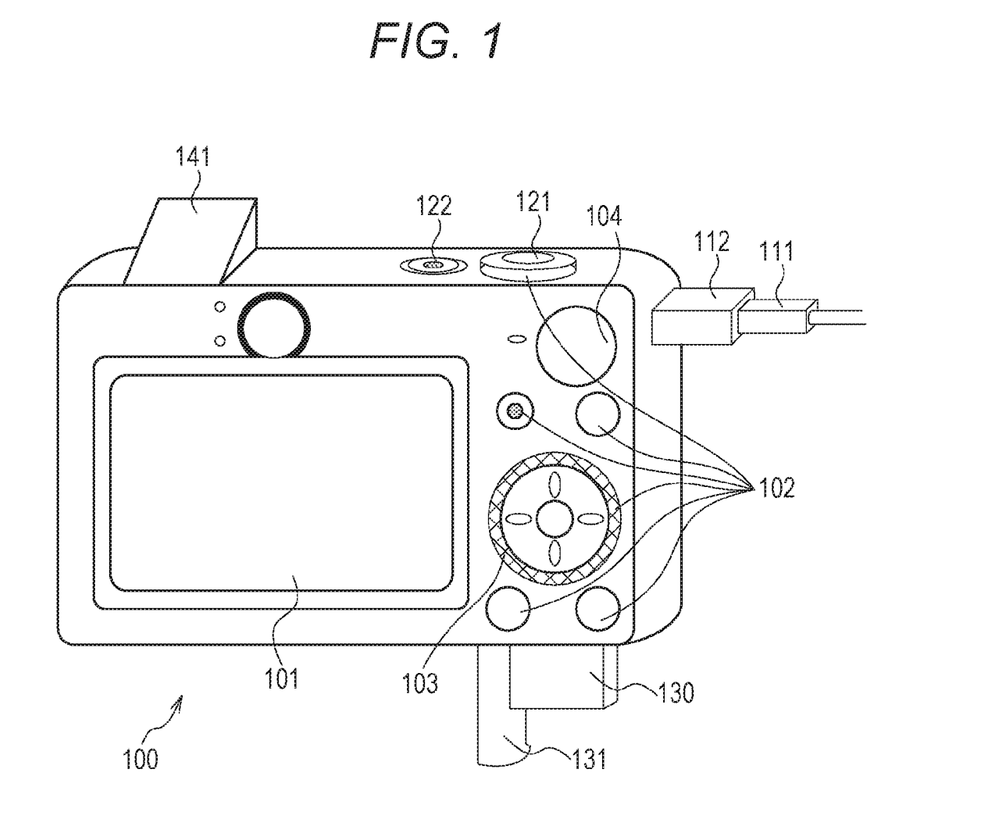
FIG. 1 is a rear perspective view illustrating a schematic configuration of a digital camera according to an exemplary embodiment.

FIG. 1 is a rear perspective view illustrating a schematic configuration of a digital camera according to an exemplary embodiment.

On a rear surface of a digital camera 100, a display unit 101 that displays images and various information, and an operation unit 102 that receives various operations from a user and is composed of operation members such as various switches, buttons, and the like are provided. On the rear surface of the digital camera 100, a mode selection switch 104 that switches an image pickup mode or the like, and a controller wheel 103 on which a rotation operation can be performed are also provided. On an upper surface of the digital camera 100, a shutter button 121 that issues an image pickup instruction, a power supply switch 122 that switches ON/OFF of a power supply of the digital camera 100, and a flash 141 that irradiates an object with flashlight are provided.

The digital camera 100 is connectable to an external apparatus via wired or wireless communication, and can output image data (still image data, moving image data) or the like to the external apparatus. On a lower surface of the digital camera 100, a recording medium slot (not illustrated) that can be opened or closed with a lid 131 is provided. A recording medium 130, such as a memory card, can be inserted into or removed from the recording medium slot.

The recording medium 130 stored in the recording medium slot can communicate with a system control unit 210 (see FIG. 2) of the digital camera 100. The recording medium 130 is not limited to a memory card or the like that can be inserted into or removed from the recording medium slot, but instead may be a magnetic disk, such as an optical disk or a hard disk, or may be incorporated in the main body of the digital camera 100.

Figure 2:
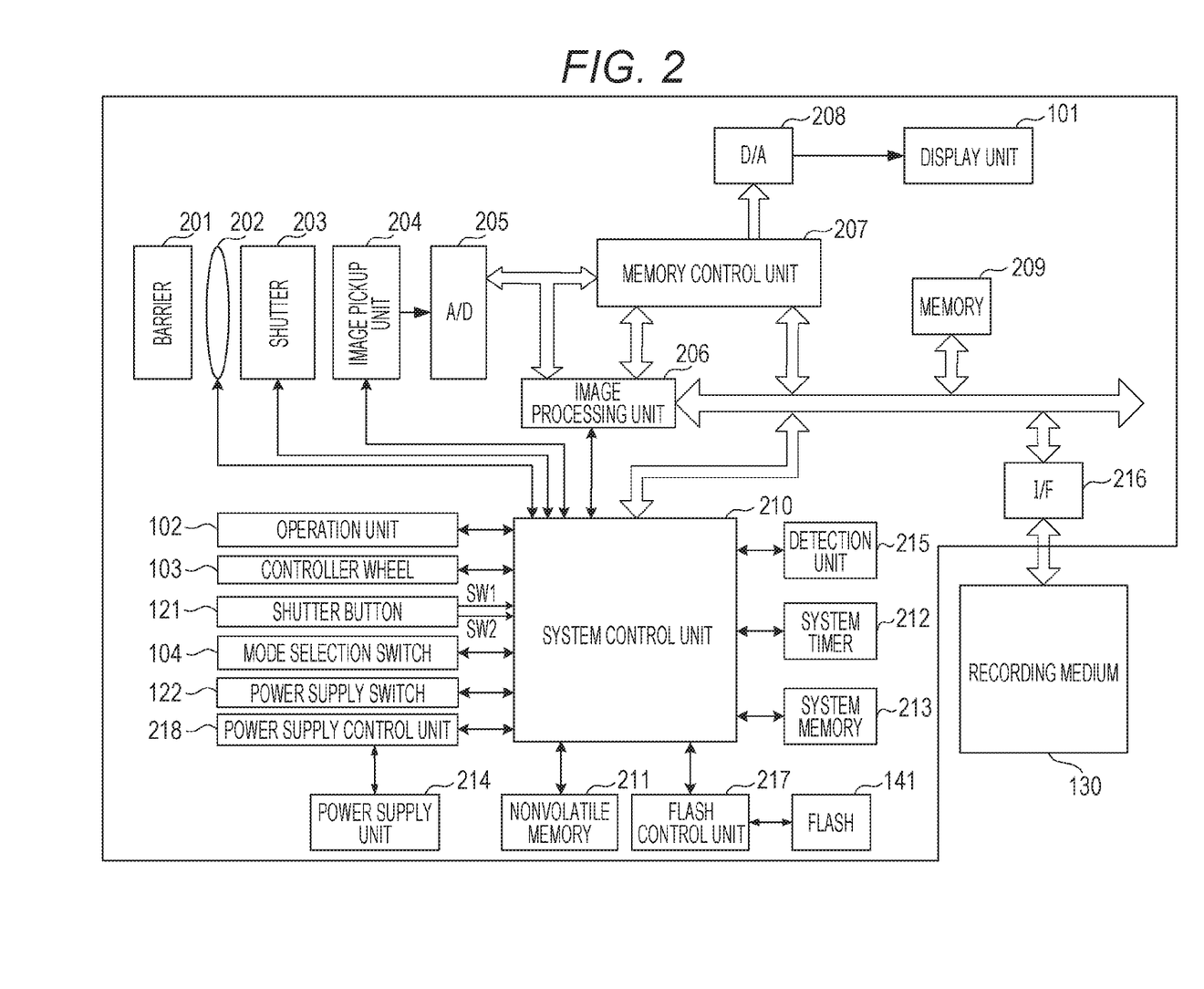
FIG. 2 is a block diagram illustrating a hardware configuration of the digital camera according to the exemplary embodiment.

FIG. 2 is a block diagram illustrating a hardware configuration of the digital camera 100. The digital camera 100 includes a barrier 201, an image pickup lens 202, a shutter 203, and an image pickup unit 204. The barrier 201 covers an image pickup optical system, thereby preventing the image pickup optical system from being contaminated or damaged. The image pickup lens 202 is composed of a lens group including a zoom lens and a focus lens, and constitutes the image pickup optical system. The shutter 203 includes an aperture function and adjusts the exposure amount for the image pickup unit 204. The image pickup unit 204 is an image sensor that converts an optical image into an electrical signal (analog signal). The image pickup unit 204 is, for example, an image sensor such as a charge-coupled device (CCD) sensor or complementary metal oxide semiconductor (CMOS) sensor having a Bayer array structure in which RGB pixels are regularly arranged. The shutter 203 may be a mechanical shutter, or may be an electronic shutter that controls an accumulation time by controlling a reset timing of the image sensor.

The digital camera 100 includes an analog-to-digital (A/D) converter 205, an image processing unit 206, a memory control unit 207, a digital-to-analog (D/A) converter 208, a memory 209, and the system control unit 210. The image pickup unit 204 outputs an analog signal to the A/D converter 205, and the A/D converter 205 converts the acquired analog signal into image data composed of a digital signal and outputs the image data to the image processing unit 206 or the memory control unit 207.

The image processing unit 206 performs correction processing, such as pixel interpolation or shading correction, white balance processing, y-correction processing, color conversion processing, or the like on image data acquired from the A/D converter 205 or data acquired from the memory control unit 207. The image processing unit 206 implements an electronic zoom function by performing image cut-out or magnification processing. Further, the image processing unit 206 performs predetermined arithmetic processing using image data on captured images. Based on the arithmetic processing result thus obtained, the system control unit 210 performs exposure control and ranging control. For example, the system control unit 210 performs Through The Lens (TTL) autofocus (AF) processing, automatic exposure (AE) processing, and pre-flash (EF) processing. The image processing unit 206 performs predetermined arithmetic processing using image data on captured images. The system control unit 210 performs TTL automatic white balance (AWB) processing using the obtained arithmetic processing result.

The image processing unit 206 includes an image combining processing circuit that combines a plurality of images to obtain a panoramic image, and determines the combining processing result. The image combining processing circuit can perform not only simple averaging combining processing, but also comparative bright combining or comparative dark combining processing to generate one piece of image data by selecting a pixel having a brightest value or a darkest value in each area of image data to be subjected to combining processing. Further, the image combining processing circuit evaluates and determines the combining processing result based on a specific criterion. For example, when the number of combined images is less than a predetermined number, or when the length of combined images is less than a reference value, it is determined that the combining processing is unsuccessful. Instead of using the configuration including the image processing unit 206, a configuration for implementing the function of image combining processing by software processing performed by the system control unit 210 may be used.

Image data output from the A/D converter 205 is written into the memory 209 via the image processing unit 206 and the memory control unit 207, or via the memory control unit 207. The memory 209 also functions as an image display memory (video memory) storing image data to be displayed on the display unit 101. The memory 209 includes a storage capacity capable of storing a predetermined number of still images, panoramic images (wide-angle images), and panoramic image combining processing results. The memory 209 can also be used as a work area in which a program or the like read out from a nonvolatile memory 211 by the system control unit 210.

Image display data (digital data) stored in the memory 209 is transmitted to the D/A converter 208. The D/A converter 208 converts the received digital data into an analog signal, supplies the analog signal to the display unit 101, so that an image is displayed on the display unit 101. The display unit 101 is a display device such as a liquid crystal display or an organic electroluminescence (EL) display, and displays images based on the analog signal from the D/A converter 208. ON/OFF of the image display on the display unit 101 is switched by the system control unit 210, and power consumption can be reduced by turning off the image display. An electronic viewfinder function for displaying a live view in such a manner that the digital signal stored in the memory 209 from the image pickup unit 204 through the A/D converter 205 is converted into an analog signal by the D/A converter 208 and images are sequentially displayed on the display unit 101.

The digital camera 100 includes the nonvolatile memory 211, a system timer 212, a system memory 213, a detection unit 215, and a flash control unit 217. The nonvolatile memory 211 is a memory (such as an Electrically Erasable Programmable Read-Only Memory (EEPROM)) capable of electrically erasing or storing data, and stores programs to be executed by the system control unit 210, constants for operation, and the like. The nonvolatile memory 211 includes an area for storing system information and an area for storing user setting information. The system control unit 210 reads out and restores various information and settings stored in the nonvolatile memory 211 upon start-up of the digital camera 100.

The system control unit 210 includes a central processing unit (CPU), and executes various program codes stored in the nonvolatile memory 211, thereby controlling the overall operation of the digital camera 100. Programs, constants or various for operation, and the like read out from the nonvolatile memory 211 by the system control unit 210 are loaded into the system memory 213. A random access memory (RAM) is used as the system memory 213. Further, the system control unit 210 performs display control by controlling the memory 209, the D/A converter 208, the display unit 101, and the like. The system timer 212 measures a time used for various control operations, or the time of a built-in clock. The flash control unit 217 controls light emission of the flash 141 depending on the brightness of the object. The detection unit 215 includes a gyroscope or a sensor, and acquires angular velocity information, orientation information, or the like about the digital camera 100. The angular velocity information includes information about an angular velocity or an angular acceleration during a panoramic image pickup operation by the digital camera 100. The orientation information includes information about an inclination or the like of the digital camera 100 in a horizontal direction.

The display unit 101, the operation unit 102, the controller wheel 103, the shutter button 121, the mode selection switch 104, the power supply switch 122, and the flash 141, which are illustrated in FIG. 2 are the same as those described above with reference to FIG. 1.

Various operation members constituting the operation unit 102 is used to, for example, select various function icons to be displayed on the display unit 101. When a predetermined function icon is selected, a function is allocated to each scene. Specifically, the operation members of the operation unit 102 operate as various function buttons. Examples of the function buttons include an end button, a return button, an image feed button, a jump button, a narrowing-down button, an attribute change button, and a DISP button. For example, when a menu button is pressed, a menu screen for performing various settings is displayed on the display unit 101. The user can intuitively perform a setting operation using the menu screen displayed on the display unit 101, four-direction (up, down, left, and right) buttons, and a SET button.

The controller wheel 103, which is an operation member on which a rotation operation can be performed, is used, for example, when selection items are designated together with the four-direction buttons. When the rotation operation is performed on the controller wheel 103, an electrical pulse signal depending on an operation amount (a rotation angle, the number of rotations, etc.) is generated. The system control unit 210 analyzes the pulse signal and controls each unit of the digital camera 100.

The shutter button 121 includes a first switch SW1 and a second switch SW2. The first switch SW1 is turned on in a half-pressed state, which is a state where the shutter button 121 is being operated. As a result, a signal for giving an instruction on image pickup preparation is transmitted to the system control unit 210. Upon receiving the signal indicating that the first switch SW1 is turned on, the system control unit 210 starts an operation such as AF processing, AE processing, AWB processing, or EF processing. The second switch SW2 is turned on in a fully-pressed state, which is a state in which the operation of the shutter button 121 is completed. As a result, a signal for giving an instruction on image pickup start is transmitted to the system control unit 210. Upon receiving the signal indicating that the second switch SW2 is turned on, the system control unit 210 performs a series of image pickup operation from reading of the signal from the image pickup unit 204 to writing of image data into the recording medium 130.

The mode selection switch 104 is a switch for switching operation modes of the digital camera 100 among various modes such as a still image pickup mode, a moving image pickup mode, and a reproduction mode. The still image pickup mode includes not only an automatic image pickup mode, but also a panoramic image image pickup mode for combining a panoramic image by the panoramic image pickup operation.

The digital camera 100 includes a power supply unit 214 and a power supply control unit 218. The power supply unit 214 is a primary battery, such as an alkaline battery or a lithium battery, a secondary battery, such as a NiCd battery, a NiMH battery, or a Li battery, an AC adapter, or the like, and supplies power to the power supply control unit 218. The power supply control unit 218 detects the presence or absence of attachment of a battery, the type of a battery, a remaining battery level, or the like in the power supply unit 214, and supplies a necessary voltage to units including the recording medium 130 for a necessary period based on the detection result and an instruction from the system control unit 210.

The digital camera 100 includes a recording medium I/F 216 that enables communication between the recording medium 130 and the system control unit 210 when the recording medium 130 is attached to the recording medium slot (not illustrated). The recording medium 130 is described in detail above with reference to FIG. 1, and thus the description thereof is omitted.

Next, a method for performing the panoramic image pickup operation and a method for combining a plurality of captured images to obtain a panoramic image will be described. First, processing for cutting out a predetermined area from image data on captured images to be combined to obtain a panoramic image will be described.

FIGS. 3A to 3D each illustrate a relationship between a direction in which the digital camera 100 moves and a cut-out area of image data during the panoramic image pickup operation using the related-art method.

Figure 3A:
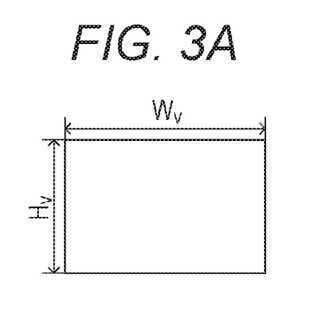
FIGS. 3A to 3D each illustrate a relationship between a direction in which the digital camera moves and a cut-out area of image data in a panoramic image pickup operation using a related-art method.
Figure 3B:
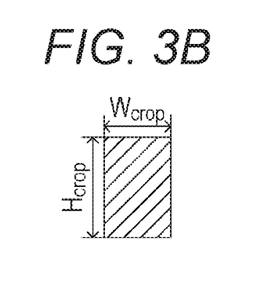

FIG. 3A illustrates an effective image area of the image sensor included in the image pickup unit 204. In FIG. 3A, "Wv" represents the number of effective pixels in the horizontal direction, and "Hv" represents the number of effective pixels in the vertical direction. FIG. 3B illustrates a cut-out area cut out from image data on a captured image. In FIG. 3B, "Wcrop" represents the number of cut-out pixels in the horizontal direction, and "Hcrop" represents the number of cut-out pixels in the vertical direction.

Figure 3C:
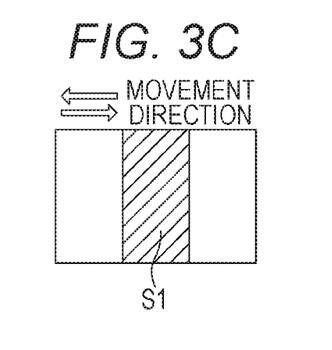

FIG. 3C illustrates a cut-out area from image data obtained when the panoramic image pickup operation is performed while the digital camera 100 is moved in the horizontal direction indicated by an arrow. A hatched area S1 illustrated in FIG. 3C represents a cut-out area from image data, and satisfies the following Inequality (1) and Equation (2).

$$Wv > W\text{crop} \quad (1)$$

$$Hv = H\text{crop} \quad (2)$$

Figure 3D:
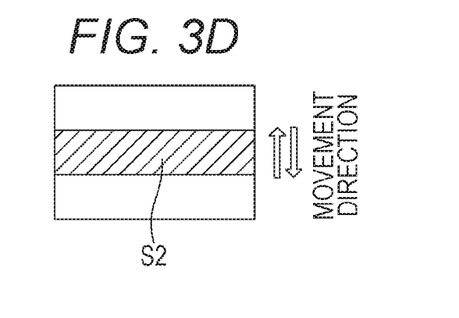

Similarly, FIG. 3D illustrates a cut-out area from image data obtained when the panoramic image pickup operation is performed while the digital camera 100 is moved in the vertical direction indicated by an arrow. A hatched area S2 illustrated in FIG. 3D represents a cut-out area from image data, and satisfies the following Equation (3) and Inequality (4).

$$Wv = W\text{crop} \quad (3)$$

$$Hv > H\text{crop} \quad (4)$$

Cut-out areas from image data on a captured image may be different for each image data. For image data obtained at the start of the panoramic image pickup operation and at the end of the panoramic image pickup operation, a wide cut-out area may be used to increase a field angle. The cut-out area from image data can be determined depending on, for example, the difference between the angle of the digital camera 100 immediately after the image pickup operation and the angle of the digital camera 100 in the previous frame. The storage capacity of the memory 209 can be saved by cutting out only image data necessary for panoramic image combining processing and storing the image data.

Next, a panoramic image combining method will be described. The system control unit 210 reads out cut-out areas from the memory 209 stored during the panoramic image pickup operation, and performs panoramic combining processing on the read image data.

Figure 4A:
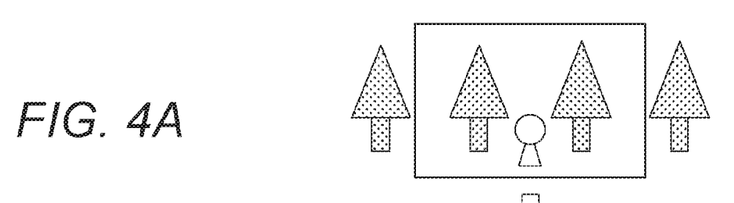
FIGS. 4A to 4F each illustrate a processing flow of combining a panoramic image by using the related-art method.
Figure 4B:
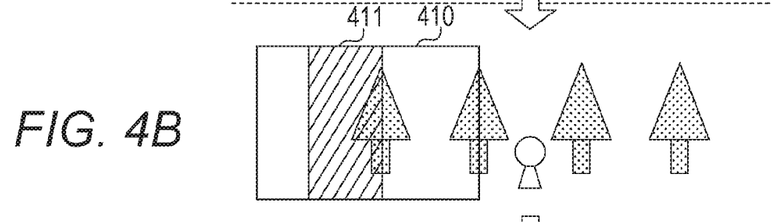
Figure 4C:
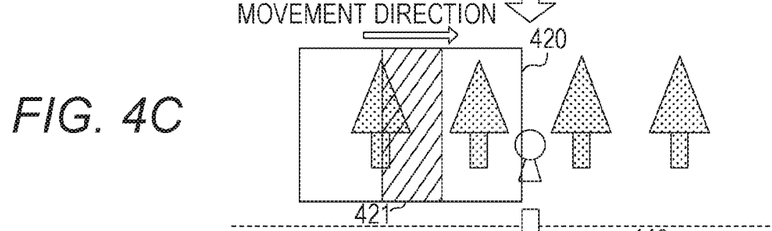
Figure 4D:
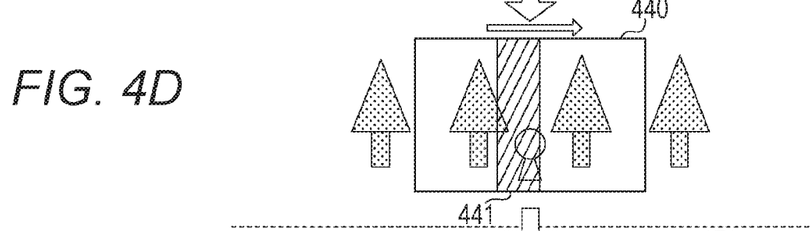
Figure 4E:
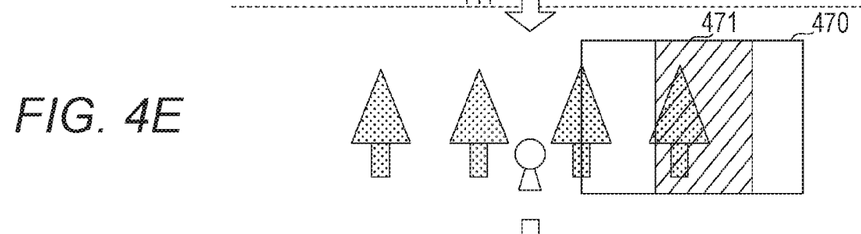

FIGS. 4A to 4F each illustrate a processing flow of combining a panoramic image using the related-art method. In FIGS. 4A to 4F, a dot-hatched area schematically represents a row of trees in an image sensing field, and an obliquely-hatched area represents a cut-out area from image data. FIG. 4A illustrates a state where the user presses the shutter button 121 and the first switch SW1 is turned on, and the user performs a focus adjustment on a main object. FIG. 4B illustrates a position where the second switch SW2 of the shutter button 121 is turned on, and a field angle is set at one end of a panoramic image obtained by performing combining processing by the user. FIG. 4B illustrates a state where the image pickup unit 204 captures an image 410. FIGS. 4C to 4E each schematically illustrate a state in which the panoramic image pickup operation is performed while the digital camera 100 is moved toward the other end of the panoramic image obtained by performing combining processing by the user. FIG. 4E illustrates a state where the user stops pressing the shutter button 121 and the panoramic image pickup operation is finished. Referring to FIGS. 4B to 4E, the image pickup unit 204 captures seven images, i.e., images 410 to 470, in total, and the images 430, 450, and 460 are not illustrated. The image processing unit 206 performs cut-out processing on the images 410 to 470 captured by the image pickup unit 204, and generates cut-out areas 411 to 471. In the system control unit 210, the width of each cut-out area may be preliminarily determined, or may be varied depending on a movement velocity or the like of the digital camera 100 during the panoramic image pickup operation.

Figure 4F:
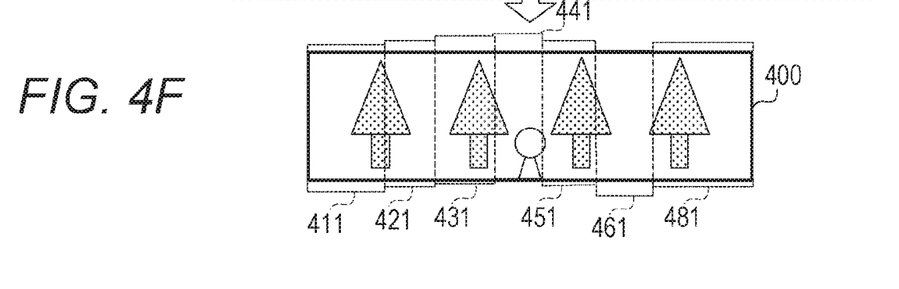

FIG. 4F illustrates a panoramic image that is obtained by the image processing unit 206 by combining a plurality of images captured by the image pickup unit 204. In this case, the system control unit 210 performs alignment processing on images before combining the images. In addition, since the upper side and the lower side of each of the cut-out areas 411 to 471 are not aligned due to camera shake or the like, the image processing unit 206 performs cut-out processing for cutting out a part of an image in the longitudinal direction. As a result, the image processing unit 206 generates a panoramic image as indicated by an area 400.

The system control unit 210 performs alignment processing based on a plurality of motion vectors detected by the image processing unit 206. For example, the image processing unit 206 divides a cut-out area into small blocks of an arbitrary size, and calculates a corresponding point between images at which the sum of absolute differences (SAD) of brightness is minimum for each small block. The system control unit 210 can calculate a motion vector based on the calculated corresponding point at which the SAD is minimum. The system control unit 210 may use the sum of squared differences (SSD), normalized cross correlation (NCC), and the like, in addition to the SAD.

For ease of illustration, FIG. 4 illustrates a state where there is no area where the cut-out areas 411 to 471 overlap each other and the cut-out areas 411 to 471 are adjacent to each other. However, in practice, it is necessary that an area overlapping a cut-out area be present so that processing for alignment, such as the SAD, can be performed. If an overlapping area is present, the image processing unit 206 outputs, to the combined image, pixel information indicating one cut-out area on the left side with respect to the center of the overlapping area and pixel information indicating the other cut-out area on the right side with respect to the center of the overlapping area. Alternatively, the image processing unit 206 outputs a value obtained by combining pixel information about cut-out areas on both sides by 50% onto a boundary, and performs combining processing by increasing the ratio of one cut-out area on the left side of the boundary and increasing the ratio of the other cut-out area on the right side of the boundary as the distance from the boundary increases.

As described above, to carry out the present exemplary embodiment, it is essential to detect motion vectors accurately. However, in practice, motion vectors cannot be detected due to various factors. For example, when the panoramic image pickup operation is performed with the digital camera being held in user's hands, it becomes difficult to detect feature points due to camera shake or the like, which leads to a deterioration in the accuracy of motion vectors.

Figure 5:
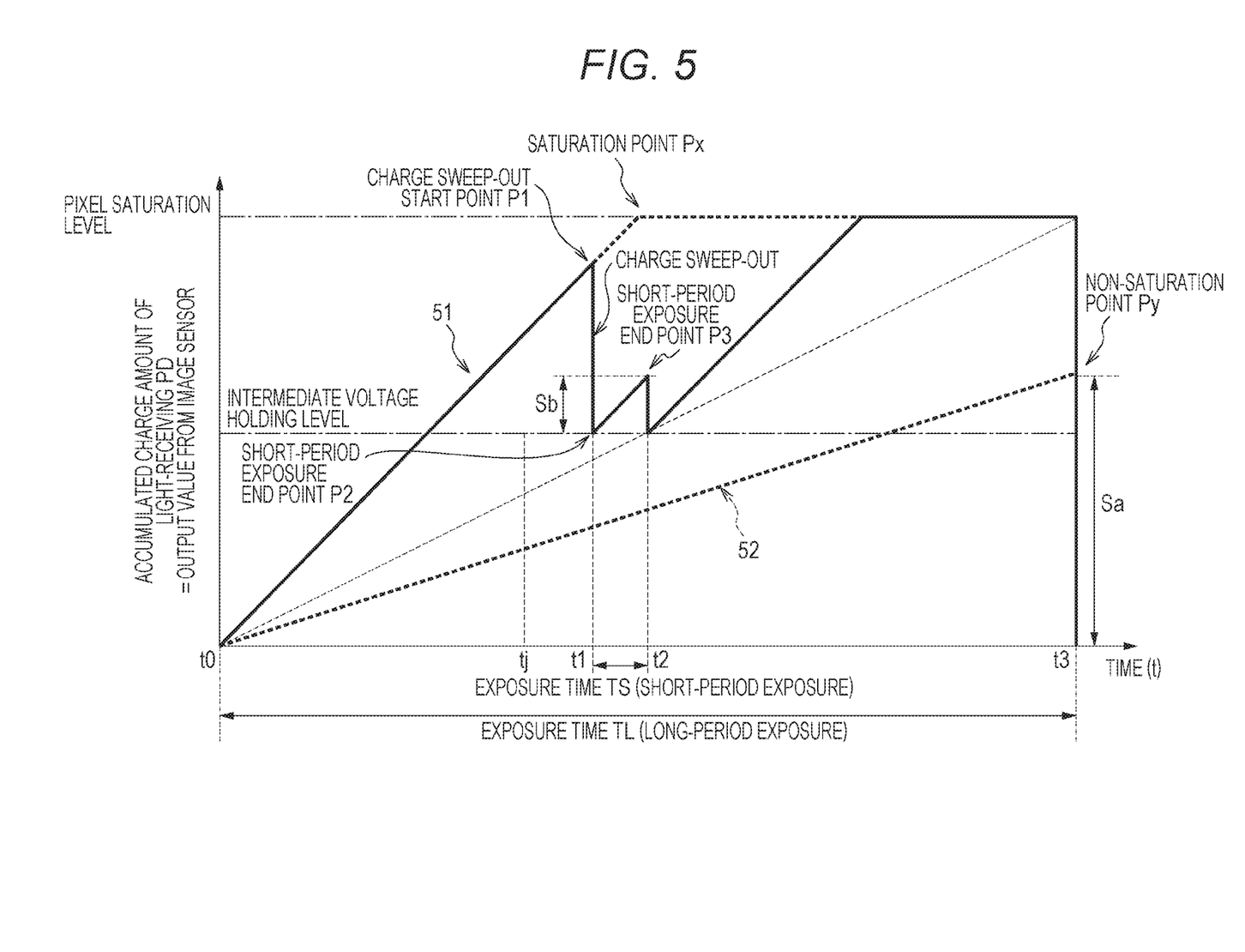
FIG. 5 is a graph illustrating a relationship between an output value of an image sensor and an exposure time according to the exemplary embodiment.
Figure 6A:
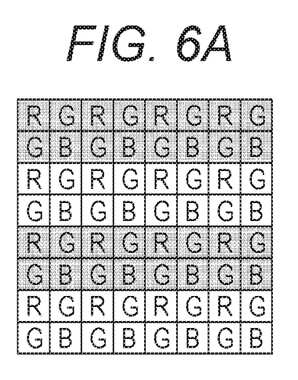
FIGS. 6A to 6E each illustrate an example of a Bayer array of the image sensor according to the exemplary embodiment.
Figure 6B:
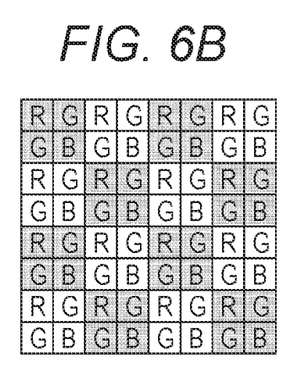
Figure 6C:
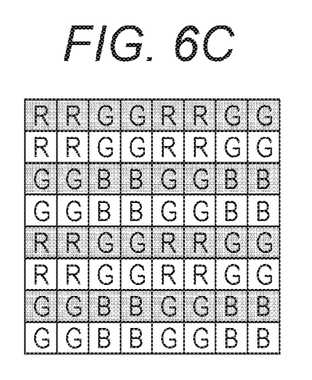
Figure 6D:
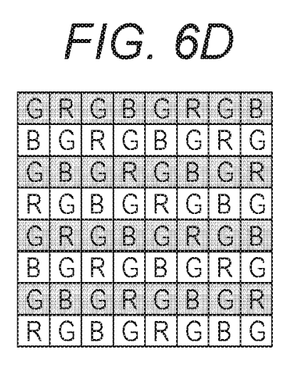
Figure 6E:
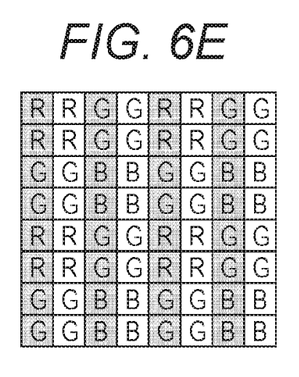

To solve the above-described problem, according to the present exemplary embodiment, deterioration in the accuracy of motion vectors is prevented using the image sensor capable of generating two images with different exposure times in one image pickup operation. FIG. 5 is a graph illustrating a relationship between an output value of the image sensor and an exposure time according to the present exemplary embodiment. A horizontal axis represents time (t), and a vertical axis represents an accumulated charge amount (e) in a photodiode (PD) constituting a photoelectric conversion element corresponding to one pixel of a solid-state image sensor.

For example, when the amount of light reception by the photodiode (PD) is large, that is, a bright object is treated, the accumulated charge amount with a lapse of time increases sharply as indicated by a solid line 51. On the other hand, when the amount of light reception by the photodiode (PD) is small, that is, a dark object is treated, the accumulated charge amount with a lapse of time increases gently as indicated by a dotted line 52.

Times t0 to t3 each correspond to an exposure time TL for acquiring a long-period exposure image. Also, in the dotted line 52 as the long-period exposure time TL, the accumulated charge amount does not reach a saturation level (non-saturation point Py) at time t3, and an accurate gradation expression at the exposure time TL can be obtained using an electrical signal obtained based on an accumulated charge amount (S a).

On the other hand, in the solid line 51, for example, at time t1 (charge sweep-out start point P1) illustrated in FIG. 5, the accumulated charge in the photodiode (PD) is swept out once. In the charge sweep-out processing, the charge accumulated in the photodiode (PD) is swept out to an intermediate voltage holding level to be controlled, instead of sweeping out all the charge accumulated in the photodiode (PD). After the charge sweep-out processing, a short-period exposure is executed again at an exposure time TS (t1 to t2). Specifically, the short-period exposure for a period from a short-period exposure start point P2 to a short-period exposure end point P3 illustrated in FIG. 5 is performed. Through the short-period exposure, an accumulated charge amount (Sb) is obtained, and a pixel gradation level is determined based on an electrical signal obtained based on the accumulated charge amount (Sb).

In the case of determining a pixel value based on the electrical signal based on the accumulated charge amount (Sa) obtained through the long-period exposure and the electrical signal based on the accumulated charge amount (Sb) obtained through the short-period exposure, an estimated accumulated charge amount obtained when the exposure is performed for the same time, or an electrical signal output value corresponding to the estimated accumulated charge amount is calculated, and a pixel value level is determined based on the calculation result.

By applying one of the two types of exposure time determination methods as described above to each of the plurality of photodiodes provided in the image sensor, images with different exposure times can be obtained at the same time.

FIGS. 6A to 6E each illustrate an example of the Bayer array of the image sensor according to the present exemplary embodiment. As illustrated in FIGS. 6A to 6E, images with different exposure times can be captured at the same time by using the Bayer array in which long-period exposure pixels and short-period exposure pixel are alternately arranged.

Pixels on which the long-period exposure and the short-period exposure are performed can be switched by electrical control. For example, at a time tj illustrated in FIG. 5, the amount of charge accumulated in the pixels of the entire image sensor may be determined by non-destructive reading, and which one of the long-period exposure and the short-period exposure is performed may be determined again at each pixel. Specifically, it is determined whether whiteout occurs in each long-period exposure pixel, and it is determined whether blackout occurs in each short-period exposure pixel, by using the amount of charge at time tj. Long-period exposure pixels in which whiteout may occur are replaced by short-period exposure pixels. Similarly, short-period exposure pixels in which blackout may occur are replaced by long-period exposure pixels. Assume that the replacement between long-period exposure pixels and short-period exposure pixels only in a small part has no influence on the detection of motion vectors or the like according to the present exemplary embodiment to be described below.

As a matter of course, time t1 needs to be set after time tj.

If the above-described determination is not made, the short-period exposure may be performed from time t0.

Figure 7:
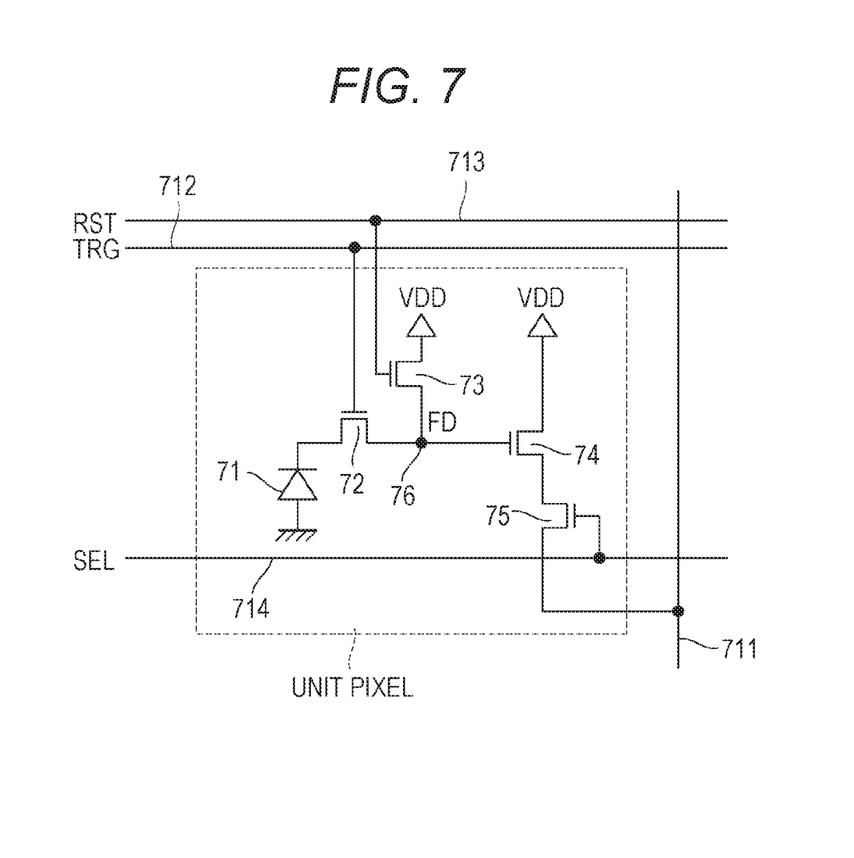
FIG. 7 illustrates a structure of an image sensor for implementing an image pickup operation according to the exemplary embodiment.

FIG. 7 illustrates a structure of an image sensor for implementing the image pickup operation according to the present exemplary embodiment.

A unit pixel has a pixel configuration including four transistors, such as a transfer transistor 72, a reset transistor 73, an amplification transistor 74, and a selection transistor 75, in addition to a photodiode 71. As the transistors 72 to 75, for example, NMOS transistors are used.

The transfer transistor 72 is connected to a node between a cathode electrode of the photodiode 71 and a floating diffusion (FD) unit 76 which is a charge voltage conversion unit. The transfer transistor 72 transfers a signal charge obtained through photoelectric conversion by the photodiode 71 and accumulated therein to the PD unit 76 by supplying a transfer pulse TRG to a gate electrode (control electrode).

A drain electrode of the reset transistor 73 is connected to a pixel power supply VDD and a source electrode of the reset transistor 73 is connected to the FD unit 76. The reset transistor 73 resets the potential of the FD unit 76 to a predetermined potential by supplying a reset pulse RST to the gate electrode prior to transfer of the signal charge from the photodiode 71 to the FD unit 76.

A gate electrode of the amplification transistor 74 is connected to the FD unit 76, and a drain electrode of the amplification transistor 74 is connected to the pixel power supply VDD. The amplification transistor 74 outputs, as a reset level, the potential of the FD unit 76 obtained after being reset by the reset transistor 73, and then outputs, as a signal level, the potential of the PD unit 76 obtained after the signal charge is transferred by the transfer transistor 72.

For example, a drain electrode of the selection transistor 75 is connected to the source electrode of the amplification transistor 74, and a source electrode of the selection transistor 75 is connected to a vertical signal line 711. When a selection pulse SEL is supplied to the gate electrode, the selection transistor 75 is turned on, and the selection transistor 75 outputs, to the vertical signal line 711, a signal output from the amplification transistor 74 with the corresponding unit pixel being in a selected state.

The selection transistor 75 can be configured to be connected to a node between the pixel power supply VDD and the drain electrode of the amplification transistor 74. The configuration of a pixel circuit is not limited to the configuration including four transistors as described above. For example, a configuration in which the selection transistor 75 is omitted, the amplification transistor 74 also functions as the selection transistor 75, and the amplification transistor 74 is shared among a plurality of unit pixels.

Figure 8:
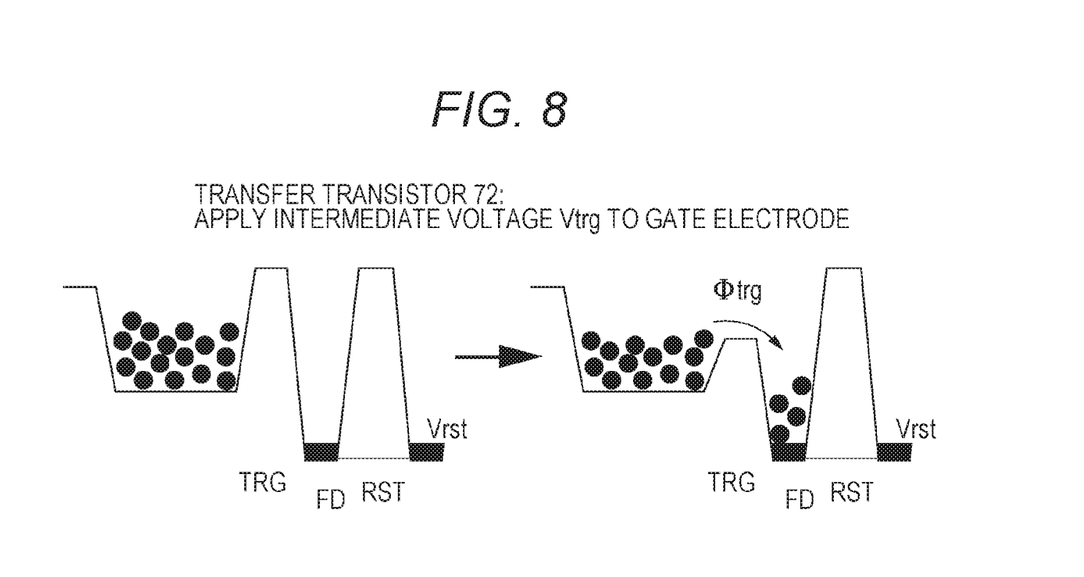
FIG. 8 illustrates the application of an intermediate voltage according to the exemplary embodiment.

FIG. 8 illustrates the application of an intermediate voltage according to the present exemplary embodiment. In the pixel having a structure as illustrated in FIG. 7, when an intermediate voltage Vtrg is supplied to the gate electrode of the transfer transistor 72, the potential decreases. When the number of electrons accumulated in the photodiode 71 and exceeds the potential obtained after the intermediate voltage Vtrg is applied, some of the electrons accumulated in the photodiode 71 are transferred to the PD unit 76. The number of electrons accumulated in the photodiode 71 becomes the level corresponding to the intermediate voltage Vtrg. By using this fact, the operation of short-period exposure pixels can be achieved. On the other hand, when a complete transfer voltage (2 Vtrg in this case) is supplied to the gate electrode of the transfer transistor 72, all the electrons accumulated in the photodiode 71 are transferred to the PD unit 76.

Figure 9:
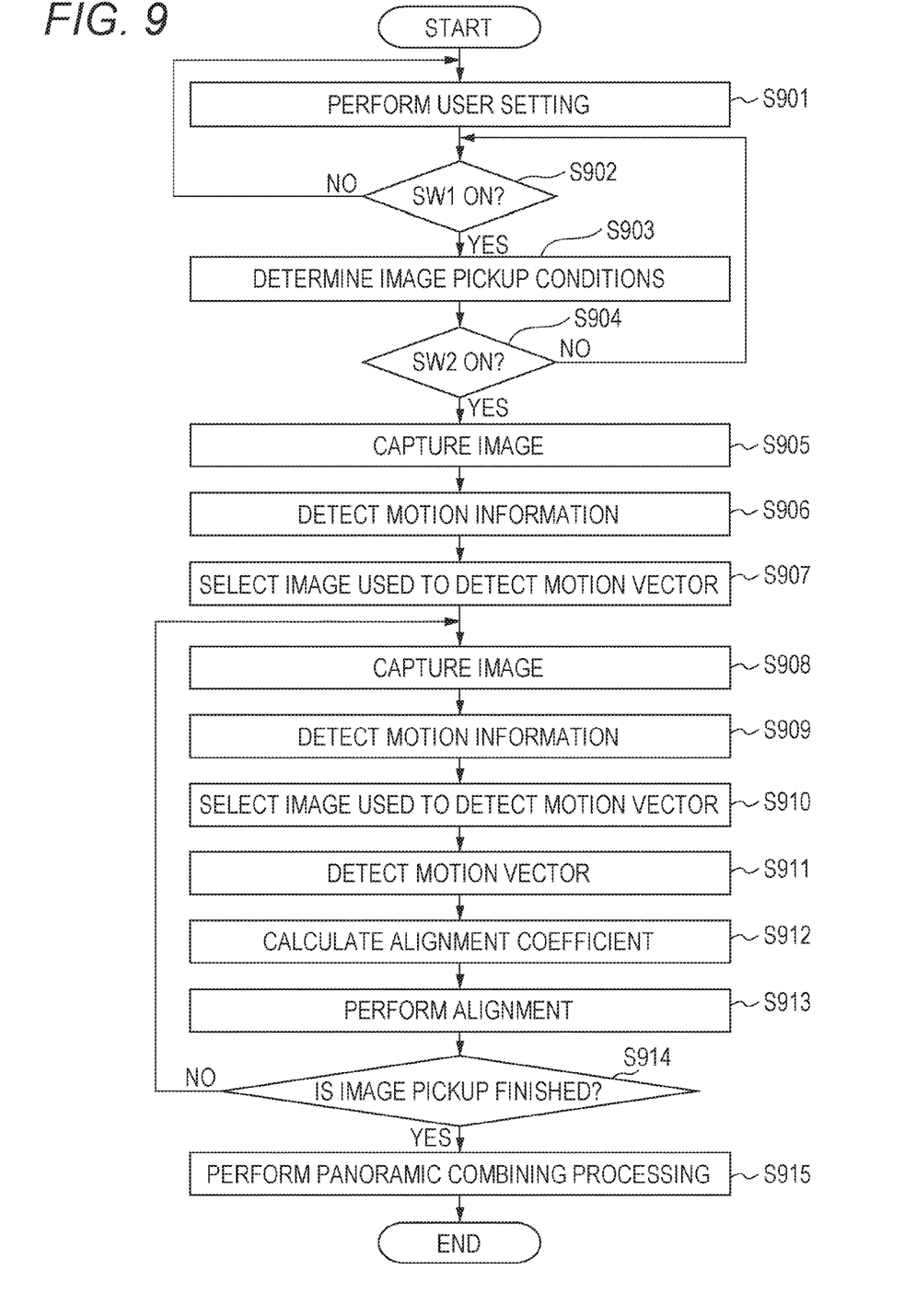
FIG. 9 is a flowchart illustrating a first exemplary embodiment.

FIG. 9 is a flowchart illustrating the present exemplary embodiment.

In step S901, the user performs setting for the image pickup operation through the operation unit 102 or the like. In this case, the user may determine the number of images to be combined to obtain a panoramic image, the size of the panoramic image, and the like.

In step S902, the system control unit 210 determines whether the first switch SW1 is turned on. When the first switch SW1 is turned on, the processing proceeds to step S903.

In step S903, the system control unit 210 performs AE processing and AF processing, and determines image pickup conditions. In this case, two exposure times, i.e., a long exposure time and a short exposure time, are set.

In step S904, the system control unit 210 determines whether the second switch SW2 is turned on. When the second switch SW2 is turned on, the processing proceeds to step S905.

Figure 10:
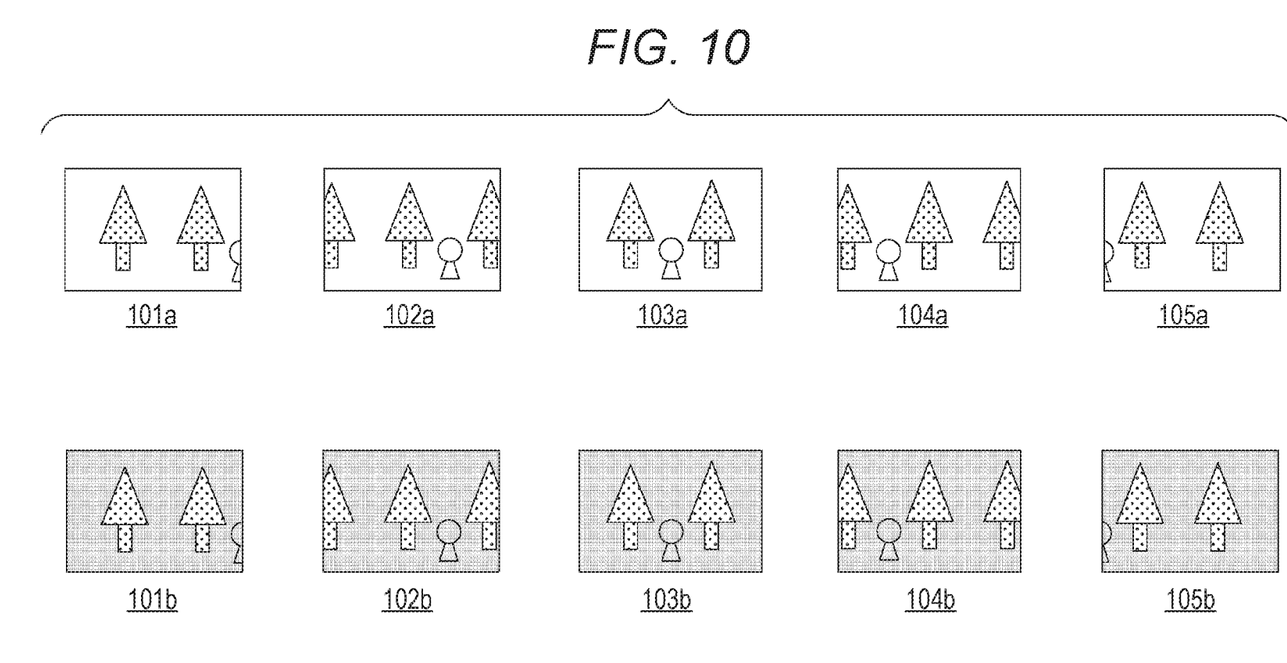
FIG. 10 illustrates captured images according to the exemplary embodiment.

In step S905, the image pickup unit 204 performs the image pickup operation under the image pickup conditions set in step S903. In this case, two images are acquired at the two exposure times, i.e., the long exposure time and the short exposure time. FIG. 10 illustrates captured images according to the present exemplary embodiment. Images 101a to 105a are images captured with the long exposure time, images 101b to 105b are images captured with the short exposure time.

In step S906, the detection unit 215 detects motion information about the digital camera 100. The term "motion information" used herein refers to a velocity at which the digital camera 100 captures an image in step S905.

In step S907, the system control unit 210 selects an image used to detect a motion vector from the two images captured by the image pickup unit 204 in step S905. In this case, the system control unit 210 selects an image used to detect a motion vector in step S910 to described below. Specifically, the system control unit 210 selects an image used to detect a motion vector from images having the same field angle and two different exposure times.

As described above, when the panoramic image pickup operation is performed, no motion vector can be detected from images due to an effect of camera shake or the like. Such an effect becomes serious as the exposure time increases. Accordingly, in the present exemplary embodiment, an image used to detect a motion vector is selected using the motion information about the digital camera 100 detected by the detection unit 215. Specifically, the system control unit 210 compares a velocity indicating the motion information detected by the detection unit 215 with a preliminarily determined threshold. If the velocity is lower than the preliminarily determined threshold, the motion vector is detected from the image obtained with the long exposure time. On the other hand, when the velocity is higher than or equal to the preliminarily determined threshold, the motion vector is detected from the image obtained with the short exposure time. On the other hand, if the velocity is equal to or higher than a predetermined threshold, the motion vector is detected from the image obtained in the short exposure time.

Next, the processing of steps S908 and S909 is similar to the processing of steps S905 and S906. In the image pickup operation in step S905 and in step S908, the image pickup operation is performed a plurality of times, thereby obtaining a plurality of images with two exposure times.

In step S910, like in step S907, the system control unit 210 selects an image used to detect the motion vector from the two images captured by the image pickup unit 204 in step S908.

Next, in step S911, the system control unit 210 detects motion vectors from the selected image.

For example, when the image 101*a* and the image 101*b* are captured, it is determined that the velocity detected by the detection unit 215 exceeds the threshold, and when the image 102*a* and the image 102*b* are captured, it is determined that the velocity detected by the detection unit 215 is lower than or equal to the threshold. The system control unit 210 detects a motion vector from each of the image 101*b* captured with the short exposure time and from the image 102*a* captured with the long exposure time. In this case, the image processing unit 206 may perform gain adjustment as needed. As the detection method, as described above, a corresponding point between two images is detected using the SAD, SSD, NCC, or the like, and a motion vector is detected through the corresponding point.

Next, in step S912, an alignment coefficient is calculated from the motion vectors detected in step S911 and a motion vector detected immediately before the motion vectors. This coefficient is, for example, is an affine coefficient represented by the following Equation (5).

[Mathematical Formula 1]

$$I' = \begin{pmatrix} x' \\ y' \\ 1 \end{pmatrix} = AI = \begin{pmatrix} a & b & c \\ d & e & f \\ 0 & 0 & 1 \end{pmatrix} \cdot \begin{pmatrix} x \\ y \\ 1 \end{pmatrix} \quad (5)$$

In Equation (5), (x', y') represents coordinates obtained after the alignment processing, and (x, y) represents coordinates obtained before the alignment processing. A matrix A indicates a coefficient for alignment calculated by the system control unit 210 in step S912. To accurately calculate the affine coefficient, it is necessary to detect at least three motion vectors which are not parallel to each other in step S911.

In steps S905 and S908, the image obtained with the long exposure time and the image obtained with the short exposure time are simultaneously obtained at the same field angle. Accordingly, even when a motion vector is detected from one of the image obtained with the long exposure time and the image obtained with the short exposure time, the alignment coefficient calculated in step S912 can be used for both the image obtained with the long exposure time and the image obtained with the short exposure time.

In step S913, the image processing unit 206 performs alignment processing on images used for combining processing using the coefficient for alignment calculated in step S912. The image used herein for combining processing generally indicates one of an image obtained with the long exposure time and an image obtained with the short exposure time. Specifically, the image processing unit 206 performs alignment processing on the images 101*a* to 105*a*, or performs alignment processing on the images 101*b* to 105*b*. This is mainly the combining processing to be described below, and thus the boundary between combined images created from the images obtained with the same exposure is natural. However, the present exemplary embodiment is not limited to this case. The image obtained with the long exposure time and the image obtained with the short exposure time may be combined while gain adjustment is performed on the images.

In step S914, the system control unit 210 determines whether the image pickup operation is finished. The system control unit 210 determines whether the image pickup operation is finished based on the number of captured images, the size of each captured image, whether pressing of the second switch SW2 is finished, or the like. When the image pickup operation is not finished, the processing returns to step S908. When the image pickup operation is finished, the processing proceeds to step S915.

In step S915, the image processing unit 206 performs combining processing on the aligned images to generate a panoramic image.

According to the first exemplary embodiment, in the digital camera 100 that performs the panoramic image pickup operation, an image used to detect a motion vector is selected based on motion information, which leads to a reduction in the effect of alignment accuracy due to camera shake.

Second Exemplary Embodiment

In a second exemplary embodiment, unlike in the first exemplary embodiment, an image from which a motion vector is selected also in consideration of the brightness of the image. The present exemplary embodiment will be described in detail below with reference to the drawings.

Descriptions of components of the second exemplary embodiment that are similar to those of the first exemplary embodiment are omitted.

In a panoramic image pickup operation, the accuracy of detecting a motion vector may deteriorate also when the brightness is extremely high or low. In the present exemplary embodiment, an image used to detect a motion vector is selected in consideration of the brightness.

Figure 11:
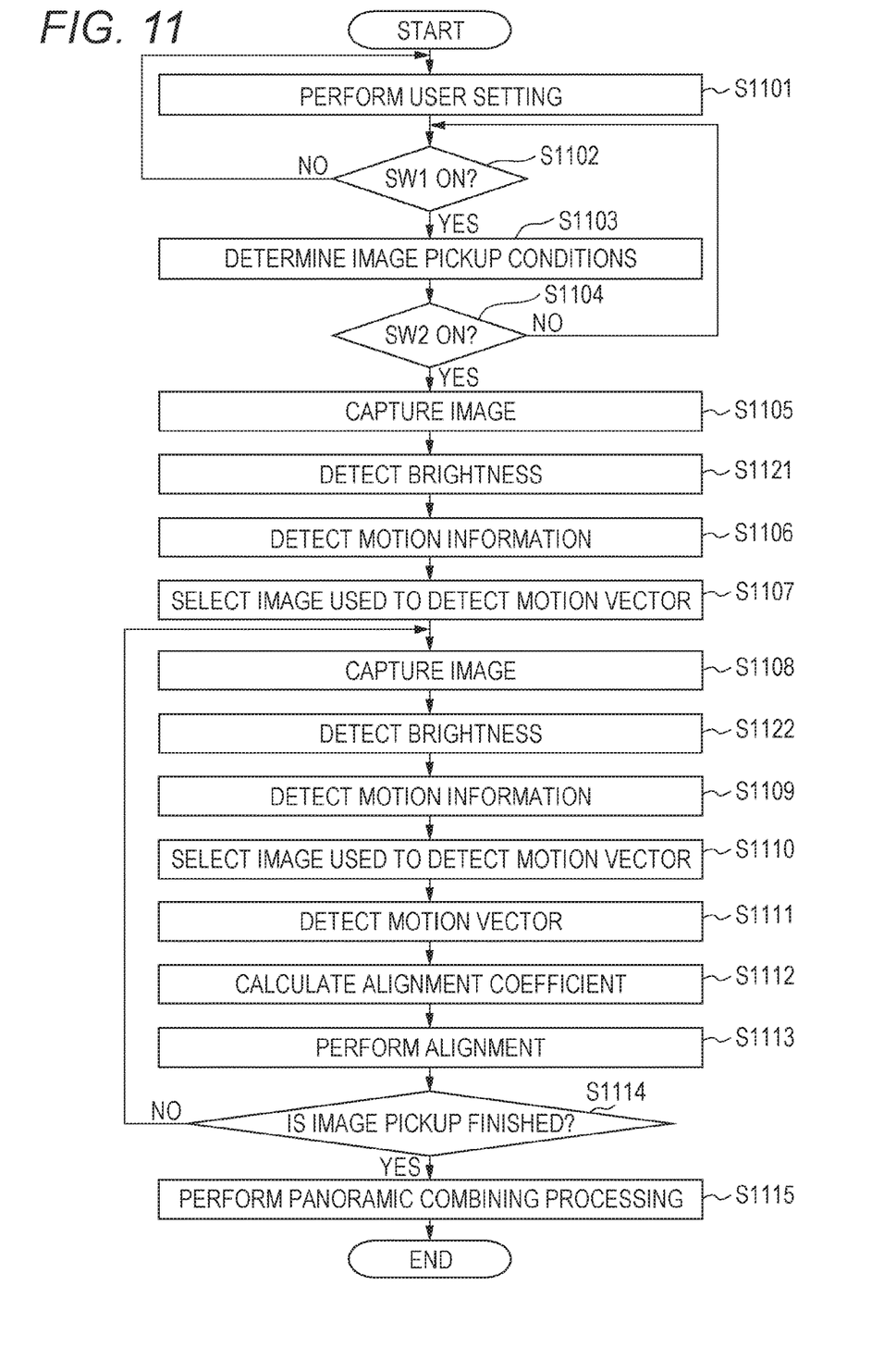
FIG. 11 is a flowchart illustrating a second exemplary embodiment.

FIG. 11 is a flowchart illustrating the present exemplary embodiment. In the flowchart illustrated in FIG. 11, unlike in the first exemplary embodiment, in steps S1121 and S1122, the image processing unit 206 performs brightness detection processing on captured images. As a brightness detection method, for example, the image processing unit 206 calculates a brightness Y by the following Equation (6) from color signals Sr, Sg, and Sb of each pixel.

$$Y=0.299Sr+0.587Sg+0.114Sb \quad (6)$$

In the selection of an image used to detect a motion vector in steps S1107 and S1110 according to the present exemplary embodiment, the image is selected also in consideration of the brightness of the image.

Also when the brightness of the image is extremely low, the accuracy of detecting feature points described above deteriorates. Accordingly, an image with an extremely low brightness, and an image with an extremely high brightness are not used.

In this case, a brightness appropriate range (or a threshold, a maximum value, or a minimum value for the brightness) is determined, and only images with a brightness that falls within the predetermined range are used to detect a motion vector. Specifically, even when a velocity detected by the detection unit 215 described in the first exemplary embodiment does not exceed a threshold for the velocity, if the brightness falls outside of the predetermined range, the image with the brightness is not used to detect a motion vector.

For example, assume that, when the images 101a and 101b are captured, the velocity detected by the detection unit 215 does not exceed the threshold for the velocity. However, assume that the brightness of the image 101a falls outside of a preliminarily determined brightness range. In the first exemplary embodiment, the image 101a captured with the long exposure time is preferentially used to detect a motion vector. However, in the second exemplary embodiment, images with an image that falls outside of the preliminarily determined brightness are not used. That is, the image 101b is used to detect a motion vector.

However, if the brightness of both the two images falls outside of the preliminarily determined brightness, an image with a brightness close to the preliminarily determined brightness range is used to detect a motion vector. Alternatively, like in the first exemplary embodiment, an image captured with the long exposure time is preferentially used.

Similarly, if the images 101a and 101b are captured, assume that the velocity detected by the detection unit 215 exceeds the threshold for the velocity. Assume that the brightness of the image 102b falls outside of the preliminarily determined brightness range. In the first exemplary embodiment, the image 101b captured with the short exposure time is used to detect a motion vector.

According to the second exemplary embodiment, unlike in the first exemplary embodiment, an image used to detect a motion vector is selected in consideration of the brightness, thereby making it possible to prevent a deterioration in the accuracy of detecting a motion vector due to an extremely high or low brightness.

Other Exemplary Embodiments

The exemplary embodiments have been described above based on a digital camera for individual use. The disclosure can also be applied to a portable device, a smartphone, a network camera connected to a server, and the like, as long as the panoramic image pickup and combining functions are mounted.

The disclosure can also be implemented by processing in which a program for implementing one or more functions according to the exemplary embodiments described above is supplied to a system or an apparatus via a network or a storage medium, and one or more processors in the system or the apparatus read out and execute the program. The disclosure can also be implemented by a circuit (e.g., an application specific integrated circuit (ASIC)) for implementing one or more functions according to the exemplary embodiments.

According to the configuration of the disclosure, it is possible to provide an image pickup apparatus capable of suppressing a deterioration in the accuracy of detecting a motion vector by outputting images captured with different exposure times in a panoramic image pickup operation, even when camera shake or the like occurs.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-139584, filed Jul. 25, 2018, which is hereby incorporated by reference herein in its entirety.

What is claimed is:

1. An image pickup apparatus, comprising:
an image sensor having pixels alternately arranged to correspond to different exposures and configured to repeatedly perform an image pickup operation to generate a set of a plurality of images with the different exposures in one image pickup operation;
a detection sensor configured to perform a first detection to detect a motion of the image sensor; and
at least one memory configured to store instructions;
at least one processor in communication with the at least one memory and configured to execute the instructions to:
perform a second detection to detect a motion vector from the images generated by the image sensor;
select an image used to detect the motion vector in the second detection based on the motion of the image sensor detected in the first detection from the set of the plurality of images with the different exposures among the images generated by the image sensor; and
generate a combined image by performing alignment and combining processing on one image from each set of the plurality of images generated by the image sensor based on the motion vector.

2. The image pickup apparatus according to claim 1, wherein the at least one processor further executes the instructions to perform the combining processing on images with same exposure time.

3. The image pickup apparatus according to claim 1, wherein the at least one processor further executes the instructions to perform the alignment processing on one of the images captured in one image pickup operation by the image sensor.

4. The image pickup apparatus according to claim 1, wherein the images with different exposures are captured with different exposure time.

5. The image pickup apparatus according to claim 1, wherein the at least one processor further executes the instructions to select the image with a smaller exposure from the set of the plurality of images as a velocity indicating the motion of the image sensor is greater than a preliminarily determined threshold, the motion being detected in the first detection.

6. The image pickup apparatus according to claim 1, wherein the at least one processor further executes the instructions to
perform a third detection to detect a brightness of the image and
select an image to detect the motion vector based on the brightness detected in the third detection.

7. The image pickup apparatus according to claim 6, wherein the at least one processor further executes the instructions to
select an image to detect the motion vector from images with the brightness detected in the third detection being within a preliminarily determined range.

8. The image pickup apparatus according to claim 1, wherein the at least one processor further executes the instructions to
perform alignment processing on selected images captured in the one image pickup operation by using the motion vector detected from any one of the plurality of images captured in the one image pickup operation in the second detection.

9. A control method to control an image pickup apparatus, comprising:
repeatedly executing an image pickup operation by using an image sensor having pixels alternately arranged to correspond to different exposures to generate a set of a plurality of images with the different exposures in one image pickup operation;
executing a first detection to detect a motion of the image sensor;
executing a second detection to detect a motion vector from the images generated by the image sensor;
executing selection of an image used to detect the motion vector in the second detection based on the motion of the image sensor detected in the first detection from the set of the plurality of images with the different exposures among the images generated by the image sensor; and
executing alignment and combining processing on one image from each set of the plurality of images generated by the image sensor based on the motion vector to generate a combined image.

10. A non-transitory computer-readable storage medium storing instructions that cause a computer to execute a method for controlling an image pickup apparatus, comprising:
repeatedly executing an image pickup operation by using an image sensor having pixels alternately arranged to correspond to different exposures to generate a set of a plurality of images with the different exposures in one image pickup operation;
executing a first detection to detect a motion of the image sensor;
executing a second detection to detect a motion vector from the images generated by the image sensor;
executing selection of an image used to detect the motion vector in the second detection based on the motion of the image sensor detected in the first detection from the set of the plurality of images with the different exposures among the images generated by the image sensor; and
executing alignment and combining processing on one image from each set of the plurality of images generated by the image sensor based on the motion vector to generate a combined image.

11. The image pickup apparatus according to claim 1, wherein the pixels are alternately arranged in a predetermined pattern.

12. The image pickup apparatus according to claim 1, wherein the alternately arranged pixels are controlled to transfer a small portion of accumulated charges for a short exposure and a large portion of accumulated charges for a long exposure.

* * * * *